(12) United States Patent  (10) Patent No.: US 12,010,585 B2
Xu et al.  (45) Date of Patent: Jun. 11, 2024

(54) METHOD, APPARATUS, AND SYSTEM FOR IDENTIFYING MOBILE WORK ZONES

(71) Applicant: HERE Global B.V., Eindhoven (NL)

(72) Inventors: Jingwei Xu, Chicago, IL (US); Yuxin Guan, Chicago, IL (US); Bruce Bernhardt, Chicago, IL (US); Weimin Huang, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 350 days.

(21) Appl. No.: 17/387,661

(22) Filed: Jul. 28, 2021

(65) Prior Publication Data

US 2022/0038860 A1 Feb. 3, 2022

Related U.S. Application Data

(60) Provisional application No. 63/059,718, filed on Jul. 31, 2020.

(51) Int. Cl.
*H04W 4/029* (2018.01)
*G06V 20/56* (2022.01)
*G08G 1/01* (2006.01)
*G08G 1/052* (2006.01)

(52) U.S. Cl.
CPC ............ *H04W 4/029* (2018.02); *G06V 20/56* (2022.01); *G08G 1/012* (2013.01); *G08G 1/0133* (2013.01); *G08G 1/052* (2013.01)

(58) Field of Classification Search
None
See application file for complete search history.

(56) References Cited

U.S. PATENT DOCUMENTS

2016/0321919 A1* 11/2016 Xu .................. H04W 4/027
2017/0116852 A1   4/2017 Xu et al.
2020/0193173 A1*  6/2020 Zhang ............... G01C 21/30

FOREIGN PATENT DOCUMENTS

WO   1999030303 A1   6/1999

OTHER PUBLICATIONS

Office Action for related European Patent Application No. 21188539. 7-1213, dated Oct. 18, 2021, 17 pages.
Wegerle et al., "Prediction of moving bottleneck through the use of probe vehicles: a simulation approach in the framework of three-phase traffic theory", Journal of Intelligent Transportation Systems, vol. 24, No. 6, Published online: Sep. 13, 2019, pp. 598-616.

(Continued)

*Primary Examiner* — Frantz Bataille
(74) *Attorney, Agent, or Firm* — DITTHAVONG, STEINER & MLOTKOWSKI

(57) ABSTRACT

An approach is provided for identifying and characterizing mobile work zones (e.g., roadway striping, pothole filling, tree trimming, etc.). The approach, for example, involves processing probe data at a lane level to determine at least one forward forming shockwave associated with a congestion front of a mobile roadwork zone on at least one lane. The approach also involves providing data indicating the mobile roadwork zone as an output. The approach further involves determining a propagation rate of the mobile roadwork zone. The approach further involves determining a congestion recovery speed, where the congestion is caused by the mobile roadwork zone.

20 Claims, 18 Drawing Sheets

(56) References Cited

OTHER PUBLICATIONS

Hoogendoorn, "Traffic Flow Theory & Simulation", retrieved from https://ocw.tudelft.nl/wp-content/uploads/4._Shockwave_theory.pdf, Feb. 14, 2010, 41 pages.

Huang et al., "Dynamic highway congestion detection and prediction based on shock waves", Research Article, ANET '10: Proceedings of the seventh ACM international workshop on VehiculAr InterNETworking, Published Sep. 24, 2010, https://doi.org/10.1145/1860058.1860061, pp. 11-20.

* cited by examiner

METHOD, APPARATUS, AND SYSTEM FOR IDENTIFYING MOBILE WORK ZONES

RELATED APPLICATION

This application claims priority to U.S. Provisional Patent Application Ser. No. 63/059,718, filed Jul. 31, 2020, entitled "METHOD, APPARATUS, AND SYSTEM FOR IDENTIFYING MOBILE WORK ZONES", which is incorporated herein by reference in its entirety.

BACKGROUND

Modern location-based services and applications (e.g., autonomous driving and other location-based application) are increasingly demanding real time traffic incident reports. For example, providing users up-to-date data on traffic flow and traffic incidents (e.g., accidents or bottlenecks) can potentially reduce congestion and improve safety. One example of a road incident that can result in traffic congestion is a work zone occurring on a roadway, particularly when the work zone is mobile (e.g., a work zone that moves along the roadway such as zones created for roadway striping, pothole filling, tree trimming, etc.). Therefore, the service providers face significant technical challenges to identify and then map mobile work zones (e.g., to predict potential road incidents).

SOME EXAMPLE EMBODIMENTS

Therefore, there is a need for an approach for identifying and characterizing mobile work zones (e.g., roadway striping, pothole filling, tree trimming, etc.), for example, using probe data, other vehicle sensor data, etc.

According to one embodiment, a computer-implemented method comprises processing probe data to determine at least one forward forming shockwave associated with a congestion front of a mobile roadwork zone. The method also comprises providing data indicating the mobile roadwork zone as an output.

According to another embodiment, an apparatus comprises at least one processor, and at least one memory including computer program code for one or more computer programs, the at least one memory and the computer program code configured to, with the at least one processor, cause, at least in part, the apparatus to process probe data at a lane level to determine at least one forward forming shockwave associated with a congestion front of a mobile roadwork zone on at least one lane. The apparatus is also caused to provide data indicating the mobile roadwork zone as an output.

According to another embodiment, a non-transitory computer-readable storage medium carries one or more sequences of one or more instructions which, when executed by one or more processors, cause, at least in part, an apparatus to process probe data at a lane level to determine at least one forward forming shockwave associated with a congestion front of a mobile roadwork zone on at least one lane. The apparatus is also caused to provide data indicating the mobile roadwork zone as an output.

According to another embodiment, an apparatus comprises means for processing probe data at a lane level to determine at least one forward forming shockwave associated with a congestion front of a mobile roadwork zone on at least one lane. The apparatus also comprises means for providing data indicating the mobile roadwork zone as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1A:
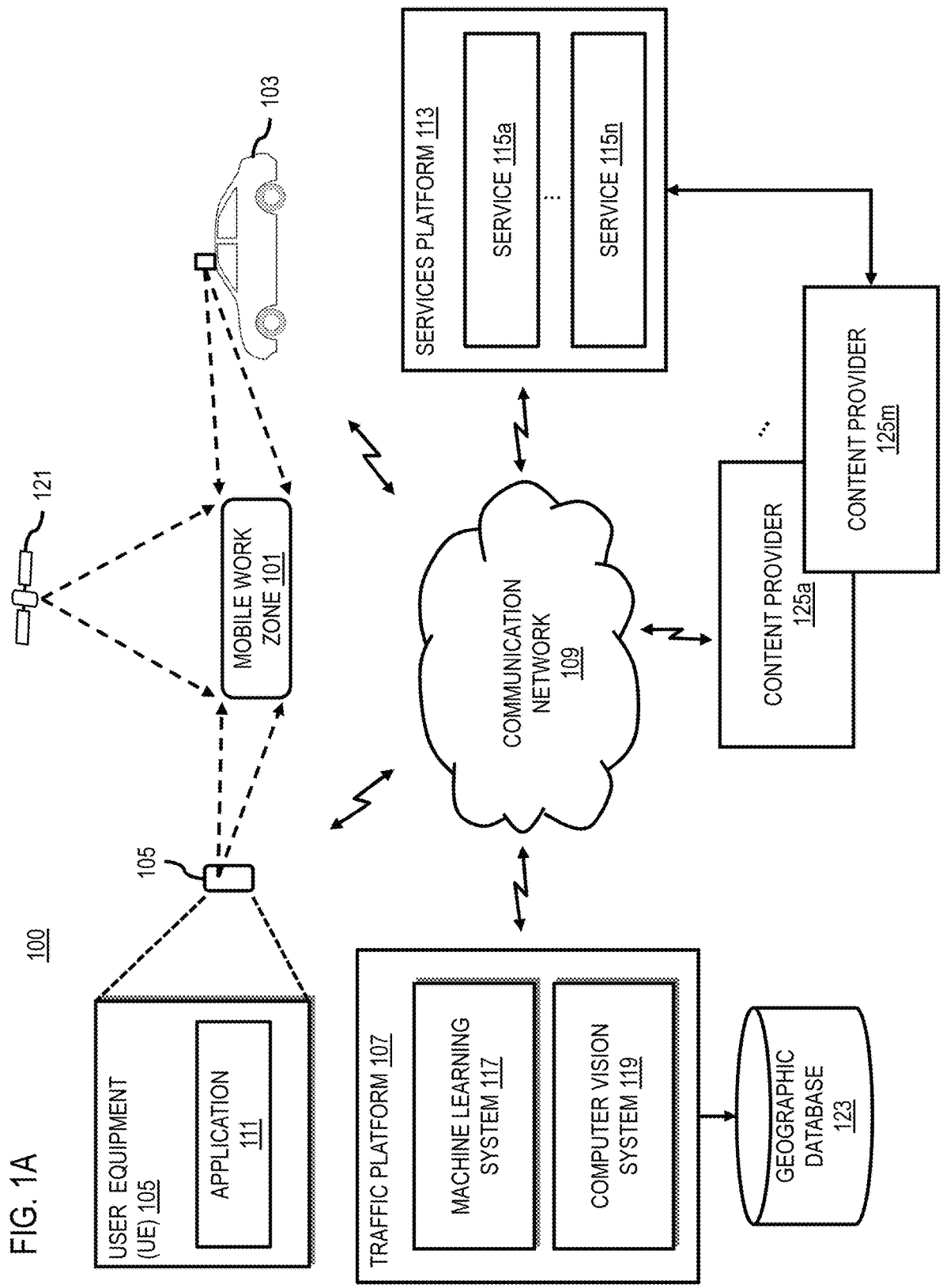
FIG. 1A is a diagram of a system capable of identifying and characterizing mobile work zones, according to one embodiment.

Examples of a method, apparatus, and computer program for identifying mobile work zones are provided. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

The embodiments described herein relate to identifying and characterizing mobile work zones, such as but not limited to work zones created for roadway striping, pothole filling, tree trimming, other roadway maintenance activities, etc. Modern location-based services and applications (e.g., autonomous driving) are increasingly demanding highly accurate and detailed digital map data and traffic incident reports across wide geographic areas. Notifying drivers that there will be an impact to the normal travel time across a road network is an important part of traffic information services. An activity that may impact the travel times is the maintenance of the road network itself or other work/activity occurring on the road segment that may lead to traffic congestion (e.g., directly by blocking traffic or indirectly whereby drivers slow down to view an incident even when the incident is not blocking their immediate path or lane). Providing vehicles (e.g., manually operated, autonomous, or semi-autonomous vehicles) with up-to-date data on traffic incidents can reduce congestion and improve safety on the road network. Currently, traffic service providers can report real-time static work zone incidents on a specific road segment and send, if appropriate, warning messages to drivers driving upstream ahead of incidents based on multiple input resources (e.g., local or community resources, service providers, regulators, etc.). As opposed to mobile work zones, static work zones have a fixed location on a roadway and are thus technically less challenging to identify. By way of example, it is estimated that 13% of the US National Highway System would include work zones during summer peak construction period. Work zones may adversely impact road safety and mobility. In addition, the American public has indicated work zones as second only to poor traffic flow in causing dissatisfaction within the road networks.

A traffic congestion queue/jam can occur and start accumulating as a result of traffic volume exceeding the available road capacity. A corresponding shockwave may happen before or after a congestion forming or releasing. Notifying drivers that there will be an impact to the normal travel time across a road network is an important part of traffic information services. In general, the traffic service providers are able to report real time static incidents including reporting work zones activity on a specific road segment and warning messages to drivers driving upstream ahead of incidents based on the multiple input resources. However, such reporting is focused on stationary work zones, where the roadwork activities are constrained within a fixed work zone area.

The Manual on Uniform Traffic Control Devices for Streets and Highways (MUTCD) defines five categories of work durations: (1) long-term stationary is work that occupies a location for more than 3 days; (2) intermediate-term stationary is work that occupies a location for more than one daylight period up to 3 days, or nighttime work lasting more than 1 hour; (3) short-term stationary is daytime work that occupies a location for more than one hour within a single daylight period; (4) Short duration is work that occupies a location up to 1 hour; and (5) mobile is work that moves intermittently or continuously. Mobile work zone notifications are lacking in the existing incident collection systems due to ambiguous locations and short durations that make it difficult to accurately present the information. As such, mobile work zones are not represented in the existing incident information systems, which leads drivers on the road network to experience congestions caused by the mobile work zones. As there are constant mobile work zones slowing down traffic in the road networks, there is a need to identify, characterize, and report mobile work zones to upstream drivers to cope with the mobile work zones.

As used herein, the term "mobile work zone" refers is a road segment or area with activities where the work moves intermittently or continuously, rarely stopping for more than a few minutes at a time. Mobile work zone operations tend to be short in duration compared with stationary work zones as defined by MUTCD above. Examples of mobile roadworks include roadway striping, transporting heavy equipment, barrier transfer machines, pavement crack or joint sealing, pothole filling, street sweeping or other debris clearing, roadside mowing and vegetation control, tree trimming, storm drain cleaning, etc. Hereinafter, "mobile work zones" and "mobile roadworks" are used interchangeably.

To address the technical challenges associated with identifying mobile work zones, the system 100 of FIG. 1 introduces a capability for identifying and characterizing mobile work zones based on probe data and/or other sensor data. For example, the system 100 can detect a forward forming shockwave associated with a congestion front using vehicle probe data and sensor data, and identify one or more active mobile work zones 101. The system 100 can also determine a forward forming shockwave propagation rate during the presence of a mobile work zone 101.

Figure 1B:
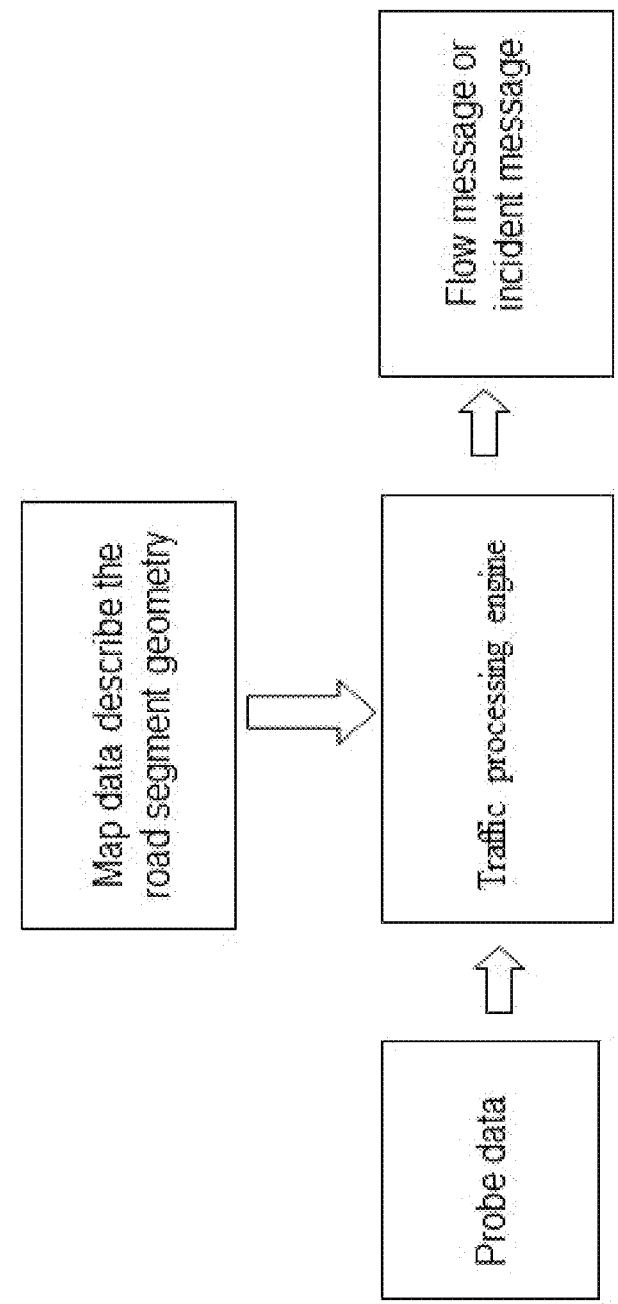
FIG. 1B is a diagram of a vehicular traffic system, according to one embodiment.

FIG. 1B is a diagram of a vehicular traffic system, according to one embodiment. In this embodiment, the system 100 can take probe data from multiple resources as input, applying one or more algorithms to the probe data and relevant map data, and deliver flow or incident messages (indication one or more work zones 100 as output through a traffic processing engine as shown in FIG. 1. The messages (e.g., flow messages, incident messages, etc.) can be delivered to end users in two ways either by over the air radio interfaces or by the connected internet.

For instance, the traffic processing engine retrieves real time probe data including sensor data received from probe vehicles 103 (e.g., autonomous vehicles, highly autonomous driving (HAD) vehicles, semi-autonomous vehicles, etc.) and/or mobile devices 105, and map artifact data which describes the road segment topology and geometry. In one embodiment, the traffic processing engine is a part of a traffic platform 107 having connectivity to the vehicles 103 and mobile devices 105 via a communication network 109.

In one instance, the real-time probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

Upon receiving real time probe data, the traffic processing engine can ingest these probe data, perform steps such as map matching, pathing, etc., and then output an estimate of a current travel speed for a given road segment (e.g. a road link, a traffic message channel (TMC) link, etc.). Based on an output speed category, the traffic processing engine can determine a road condition as in free flow, queueing, stationary, or conditions as describe in the traffic flow theory. In the traffic flow theory, there are six types of classical traffic shockwaves each of which represents a unique transition state between a congestion and a free flow traffic, and the area bounding the shockwaves are considered as congestion in time-space-diagram (TSD) plots. From a user perception perspective, driving speeds equal to or lower than a queueing speed would be considered as a traffic congestion. The transition of the road condition into and out of the congestion state is called congestion forming and releasing, and can cause traffic shockwaves as described. The most common congestion is a triangular shape bounded by backward forming, frontal stationary, and forward recovery shockwaves, which is typical from a congestion at a bottleneck location.

Forward forming shockwaves, also known as moving bottlenecks, may be caused by a slow-moving vehicle in the traffic. The traffic capacity usually is not entirely cut-off, just temporarily reduced across the length of the roadworks. Since the roadworks is moving forward along the road, the signature of the upper left region of the polygon. While a slow-moving vehicle does not necessarily mean mobile roadwork, this phenomena along the available construction information, would make it possible to identify mobile work zones 101.

While these forward forming shockwaves associated with moving bottleneck exist in traffic theory studies, they are hard to find in current traffic systems due to their transient nature. There is theoretical modeling on mobile work zones' impact on traffic and moving bottlenecks, but no practical implementation.

The propagation of the fronts separating different traffic phases look like "shock waves" observed in different other fields of science. However, these "shock-waves" have qualitatively different characteristics in traffic flow in comparison to theoretical shockwaves of the classical Lighthill-Whitham theory. The system 100 applies field collected vehicle data (e.g., probe data) in the framework of the three-phase traffic theory to detect mobile work zones 101.

In one embodiment, the system 100 can collect mobile/vehicle probe, sensor data of a road network from multiple sources (e.g., community, service provides, regulators, etc.), split and track each vehicle path, detect at least one congestion front event, detect at least one forward forming shockwave (FFS) associated with the at least one congestion front event, determine a forward forming shockwave propagation rate, and identify at least one mobile work zone 101.

Figure 2A:
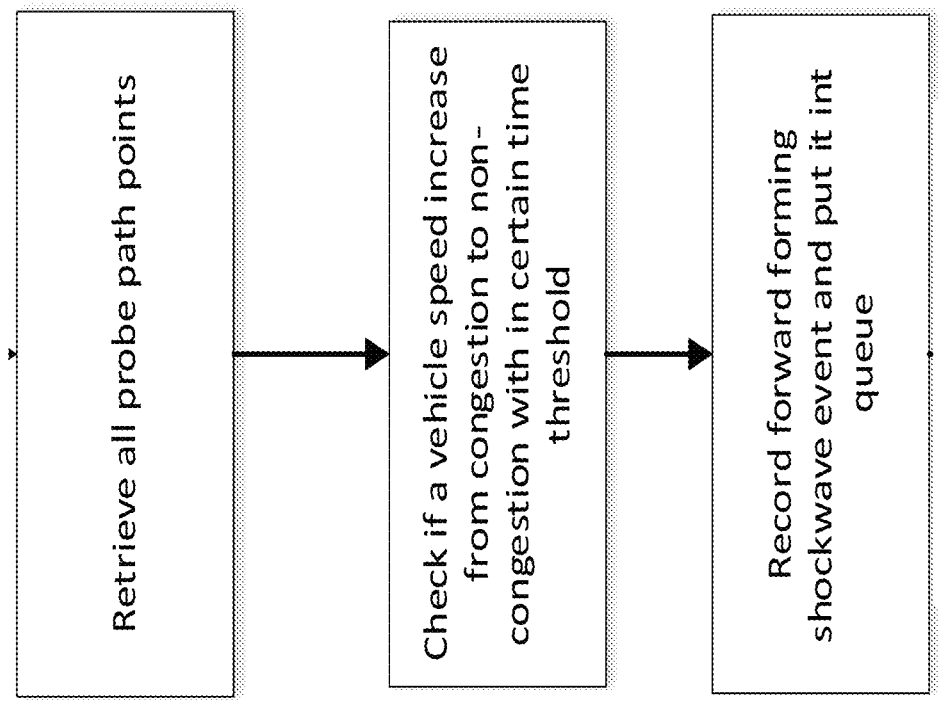
FIG. 2A is a flowchart of a process for detecting a single forward forming shockwave (FFS) event, according to one embodiment.

In one embodiment, the system 100 can follow the flowchart in FIG. 2A to detect a single forward forming shockwave (FFS) event. FIG. 2A is a flowchart of a process for detecting a single forward forming shockwave (FFS) event, according to one embodiment. In another embodiment, the system 100 can apply a forward forming shockwave (FFS) event detection algorithm as shown in Table 1.

TABLE 1

Figure 2B:
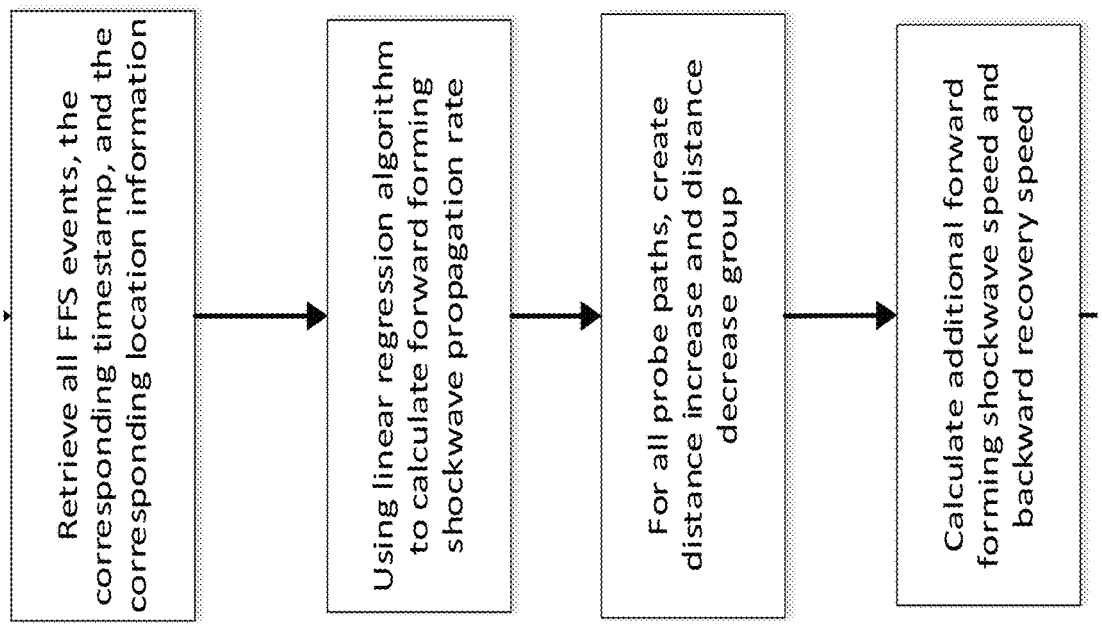
FIG. 2B is a flowchart of a process for determining a forward forming shockwave speed and a backward recovery speed, according to one embodiment.

A single forward forming shockwave (FFS) event detection algorithm: (a vehicle speed is increased by X% within Y seconds of a vehicle's travel time from congestion)
    1. Define FFS_Initial_ApprochingSpeed
    2. Define FFS_Final_MaxSpeed
    3. Define $\Delta t$
Algorithm FFS_Event_Detection
    Input: P, a sorted list of a vehicle's path probe points by GPS timestamp.
    Output: FFS event.
    if P.size = 0 return null
    for each probe point in P,
        do if
            i < j for all p[i], p[j] ∈ P,
    p[i].speed <= FFS_Initial_ApprochingSpeed,
    p[j].speed >= FFS_Final_MaxSpeed,
    delta time (p[j].time – p[i].time) < $\Delta t$
            return an FFS event composed of {p[i], p[j]} pair
return null In one embodiment, the system 100 can follow the flowchart in FIG. 2B to determine a forward forming shockwave speed and a backward recovery speed. FIG. 2B is a flowchart of a process for determining a forward forming shockwave speed and a backward recovery speed, according to one embodiment. The system 100 can also determine a forward forming shockwave propagation rate and a backward recovery or moving speed during the presence of a mobile work zone 101 using a shockwaves propagation rate algorithm shown in Table 2.

TABLE 2

A shockwaves propagation rate algorithm:
1. Trace each probe's path speed as it has been identified as an FFS event
2. Separate the points into 2 groups
   a. Distance Increasing group-points where each of the point's Distance value is increasing as time increases.
   b. Distance Decreasing group-points where each of the point's Distance value is decreasing as time increases.
3. Archive all FFS events that follow within the Distance Increasing group
4. Perform Linear regression on the points of each group, remove outliers, and the slope of the regression line, or beta, is
   a. the forward forming speed from the Distance Increasing Group.
   b. the backward recovery or jam moving speed from the Distance Decrease Group.

Figure 2C:
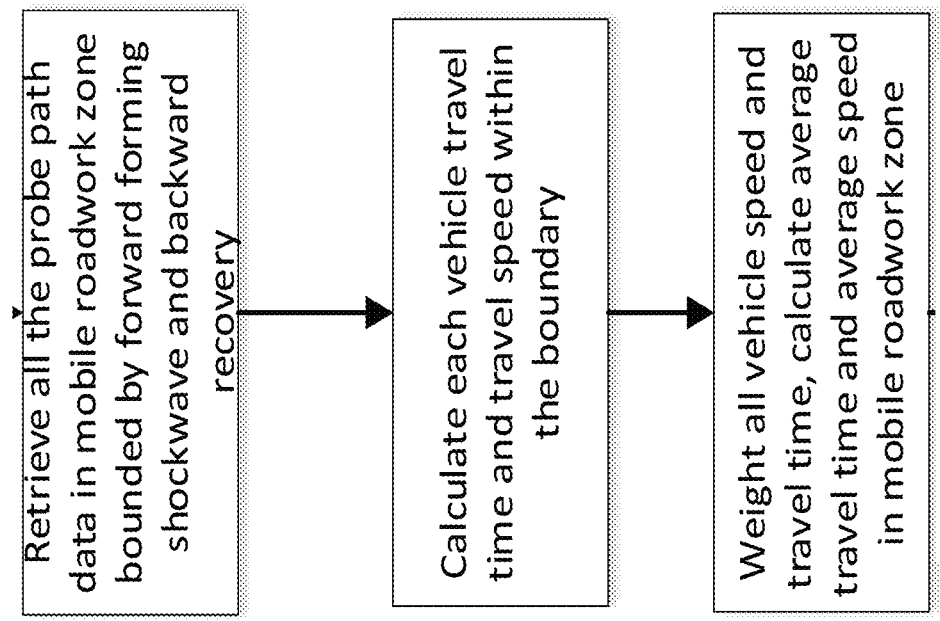
FIG. 2C is a flowchart of a process for determining a mobile work zone travel time and speed, according to one embodiment.

In one embodiment, the system 100 can follow the flowchart in FIG. 2C to determine a mobile work zone 101 travel time and speed. FIG. 2C is a flowchart of a process for determining a mobile work zone 101 travel time and speed, according to one embodiment. In another embodiment, the system 100 can apply a mobile roadwork zone traffic time algorithm as shown in Table 3.

TABLE 3

A mobile roadwork zone traffic time algorithm:
1. Confine probe data bounded by the forward forming and backward recovery shockwaves.
2. Select probe paths that travels the entire region and calculate the travel time of each path.
3. Get the average travel speed of all the selected paths and average travel time crossing the mobile road work zone region.

The system 100 then can deliver a mobile roadwork zone message along with a confidence value, e.g., over an air radio interface, transport protocol experts group (TPEG) services by a connected hypertext transfer protocol (HTTP) or user datagram protocol (UDP), dedicated short-range communications (DSRC) broadcasting, etc.

This system 100 can analyze a series of mobile roadworks events to identify the shockwave characteristics of the transition into and subsequently out of congestion associated with mobile road works activities. The signatures associated with these events may then be used to update approaching drivers to the location, expected duration and severity of these activities. Additionally, the system 100 can provide the mobile work zone 101 data to third parties, such as map or navigation service providers, road authorities, etc. to analyze the impact of such activities and determine whether to adjust the timing or duration of mobile work zones 101.

After identifying those signatures representative of mobile roadworks activities, the system 100 can compare the signatures to the other types of congestion that may occur on similar roads, using machine learning, artificial intelligence, etc. Examples of the signatures are provided for roadworks locations in the US and Germany, which can be applied world wise.

For example, the system 100 can operate the traffic platform 107 to determine additional shockwave transitions to be in a mega jam and identify and characterize associated mobile roadworks activities within the congested regions. The traffic platform 107 can use the above-described algorithms to determine and present the propagation rate of the transitions. The traffic platform 107 can also determine impact on vehicle travel times during the presence of the mobile roadworks. In this example, probe data is used to determine mobile work zones 101 (e.g., the location of roadworks, and other features) on the Earth. Ground sources like vehicles 103, robots, user equipment (UE) 105 (e.g., mobiles devices) fitted with sensor systems (e.g., global positioning system (GPS), LiDAR, etc.) are also used to acquire probe data for identifying and characterizing mobile work zones 101 (e.g., an application 111). For high definition map use (e.g., with centimeter level accuracy), the traffic platform 107 can map the features in an area using both top down and ground level sources (e.g., via satellites 121).

In one embodiment, the traffic platform 107 can train one or more machine learning models to identify and characterize mobile work zones 101 for different regions and/or context, using a machine learning system 117. By way of example, the training can be carried out using a supervised machine learning scheme, such as random forests, support vector machines, or other statistical calculation (including but not limited to averaging, determining a median, determining a minimum/maximum, etc.), etc. Embodiments of the ray intersection technical solution described herein can be very computationally simple, and easy to implement based on pure geometry. This, in turn, enables traffic platform 107 advantageously reduce the computing resources (e.g., processing power, memory, bandwidth, etc.) used for identifying and characterizing mobile work zones 101 based on a trained machine learning model. The trained machine learning models can be used to process a plurality of other probe data to detect objects or features from work zones.

In another embodiment, the traffic platform 107 can collect image data to identify and characterize mobile work zones 101, using a computer vision system 119, for example, to validate the work zone data. Objects or features refer to any feature that is photo-identifiable in the image including, but not limited to, physical features on the ground that can be used as possible candidates for survey points.

In one embodiment, the machine learning system 117 and/or the computer vision system 119 also have connectivity or access over a communication network 109 to a geographic database 123 which stores the probe data for different sources, extracted features, features correspondences, quality of sensor system pose data, derived maps, etc. generated according to the embodiments described herein. In one embodiment, the geographic database 123 includes representations of features and/or other related geographic features determined from feature correspondences to facilitate identifying and characterizing mobile work zones 101.

Examples are provided and characterized where a mobile work zone is verified by independent means for ground truth: Federal Highway A9 in Bavaria Germany heading towards Munich and US Highway 322 across the Commodore Barry Bridge in Chester, Pennsylvania exhibited the behaviors on a repeatable basis. The locations also had an independent means available to confirm the characteristics shown in the time-space diagrams were the result of roadworks operations. These two sites also represent two distinctive types of moving bottlenecks: (1) slow moving vehicles are not blocking all the other vehicles, such that some other vehicles can pass over the slow moving vehicles; and (2) slow moving vehicles are blocking all the other vehicles, such that other vehicles have to follow the slow moving vehicles. The major difference between these two types are the so called "starvation zone" in the 2nd type due to the fact that no other vehicles could pass over the slow-moving vehicles in the front.

Example: Barrier Transfer Machine Operation at Construction Site

Figure 7:
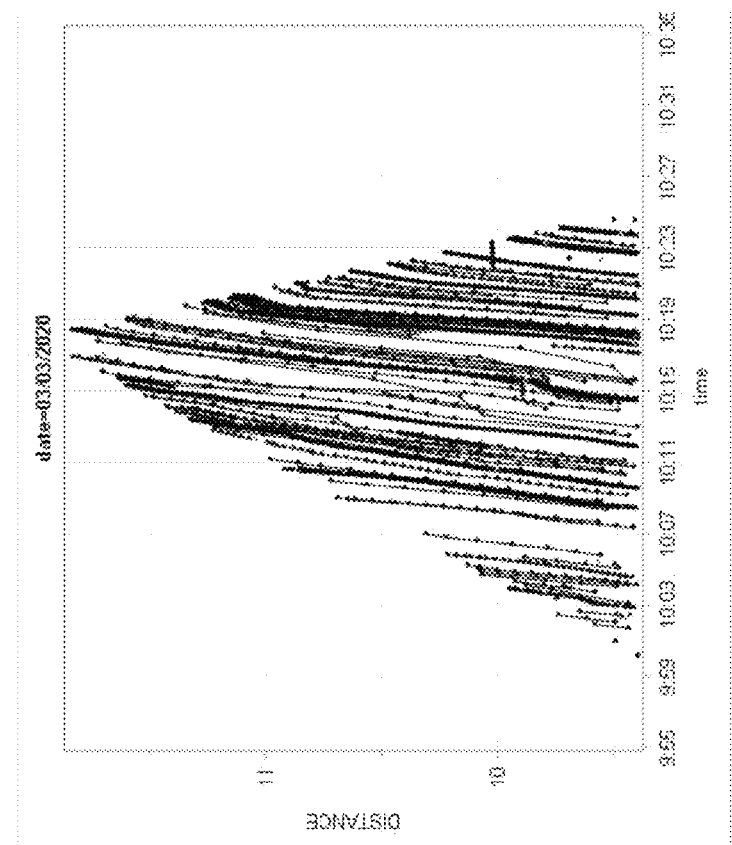
FIG. 7 is a diagram of probe paths bounded by shockwaves, according to one embodiment.

A barrier transfer operation was identified in the long-term construction zone along the A9 highway in Bavaria, Germany in the spring of 2020. This construction zone utilizes a barrier transfer machine to reduce the impact of congestion by changing road capacity based on morning inbound commuter traffic and switches lanes around 10 am in the morning to support the later outbound traffic flow. This barrier transfer machine moves the barriers in the median from one lane to another and travels at speeds between 8 to 16 kph. The operation is verified with traffic cameras on the A9 on Mar. 3, 2020, as shown in FIG. 7 (to be discussed later). The impact of this operation is clearly shown in the time-space-diagram (TSD) plot at the exact same location where the lane barrier is switched. This moving bottleneck exists every day when the lane switch is performed. The lane switch operation was stopped in late March, probably due to lower traffic volumes, and the moving bottleneck is not presented on TSD plots after that date.

In the following, the probe vehicle data was analyzed on two different days at the same location: a freeway section of the A9 in Bavaria, Germany. Connected vehicles have sent their position data with 5-10 sec resolution to the data server, which matches the data on the freeway segments. The penetration rate of the connected vehicle trajectories in the examples is in the order of 1-2% of the traffic flow rate. If we assume a total flow rate of 6000 vehicles/hour on the three-lane freeway at peak times, 60-120 connected vehicles send their position data to the data center. As a rule of thumb, this penetration rate is sufficient to reconstruct the congested traffic patterns with good quality. The number of connected probe vehicles on the study segment ranges from 150 to 220 vehicles/hour during the time, exceeding the required penetration rate. The empirical data is presented via FIGS. 3-12 using vehicle trajectories in the same gray scale and/or color scheme as in FIG. 3, in which the gray scale and/or color slide on the right of the figure shows how the speed changes corresponding to the gray scale and/or color.

Figure 3:
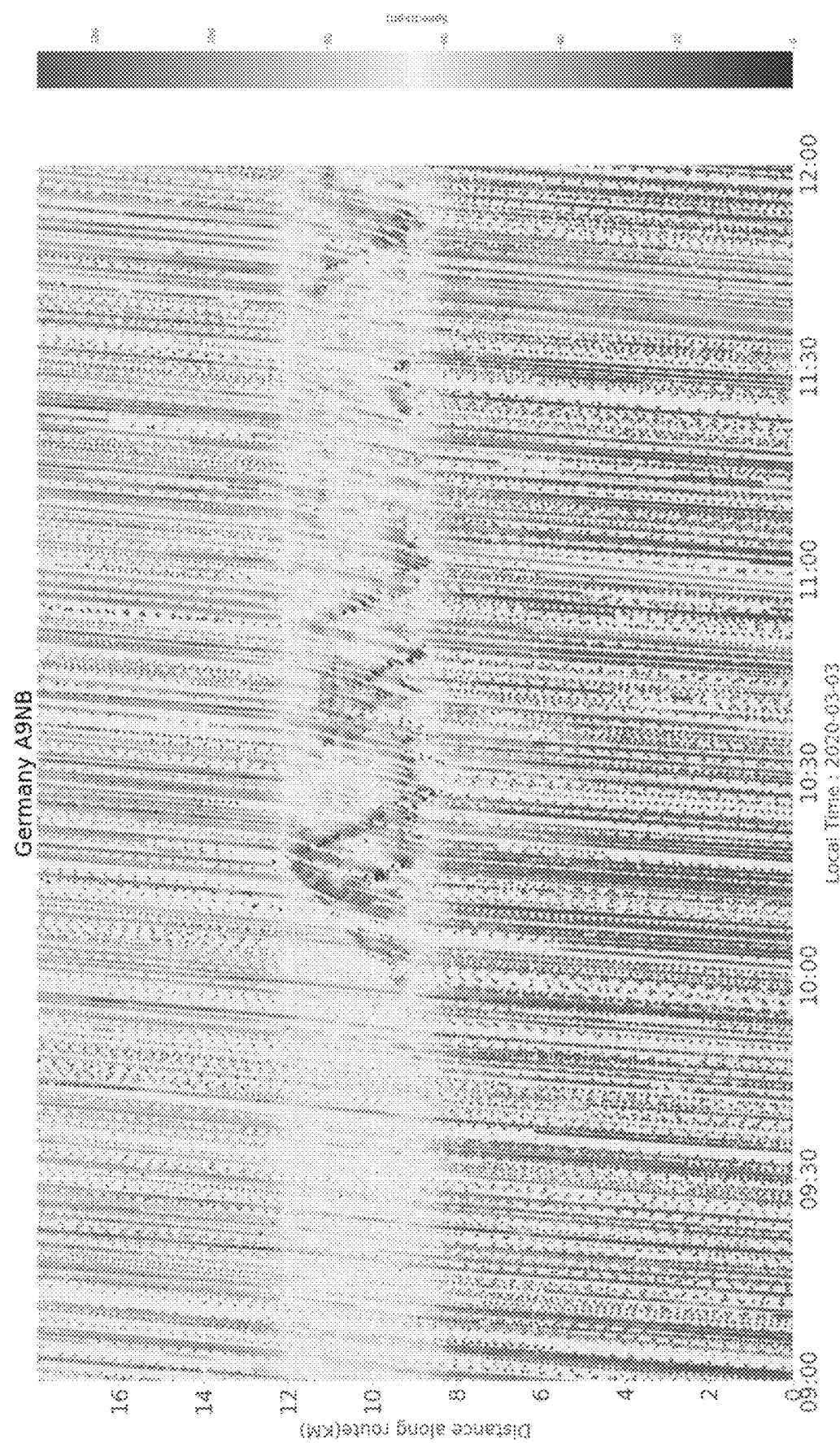
FIG. 3 is a time-space-diagram of probe vehicle data, according to one embodiment.

FIG. 3 is a time-space-diagram of probe vehicle data, according to one embodiment. For instance, the TSD plots from Mar. 3, 2020 on freeway A9 northbound for 17 km and 3 hours, when roadworks were performed on the road segment of around 9-12 km.

The following traffic phenomena are shown in FIG. 3: (1) vehicles driving in free traffic outside the area of the roadworks, (2) a reduced speed due to speed limits (assumption of 60 km/h) and inside the road construction area on the road segment of around 9-12 km, (3) a dark area growing in positive direction inside the roadworks shortly after 10:00 am, with the detail shown in FIG. 4, and (4) several dark areas propagating upstream inside the roadworks later.

Figure 4:
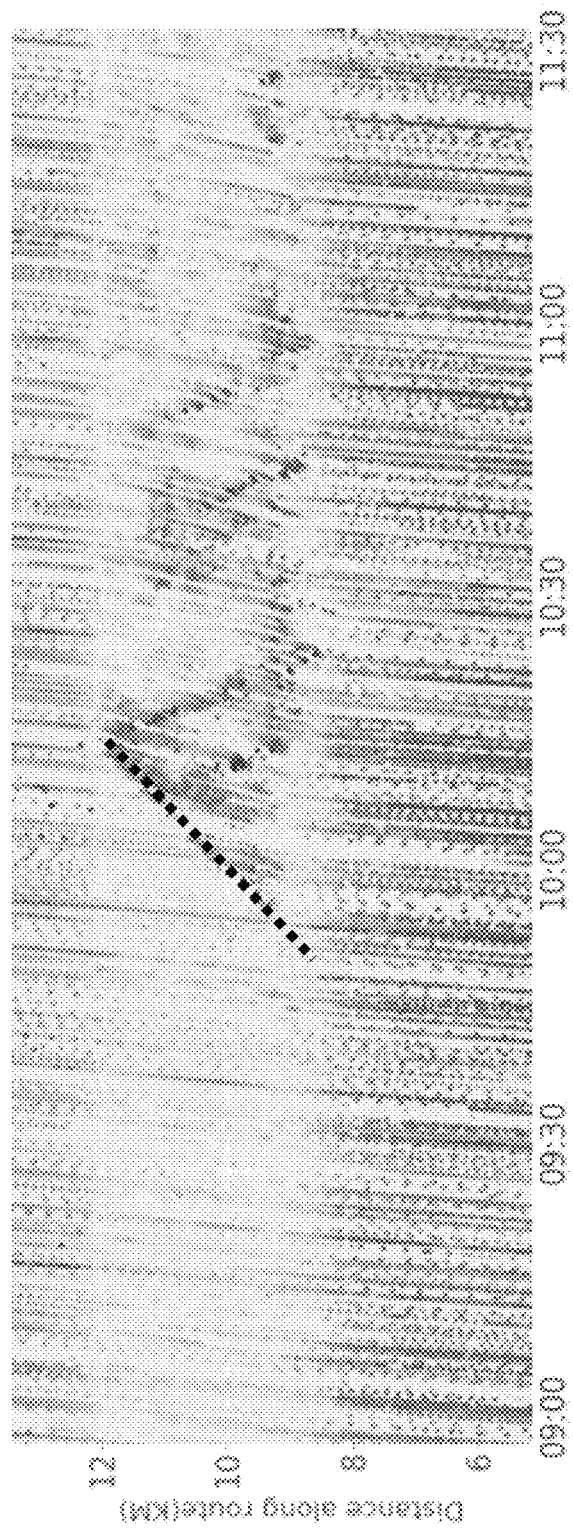
FIG. 4 is a time-space-diagram of probe vehicle data showing a moving bottleneck, according to one embodiment.
Figure 5:
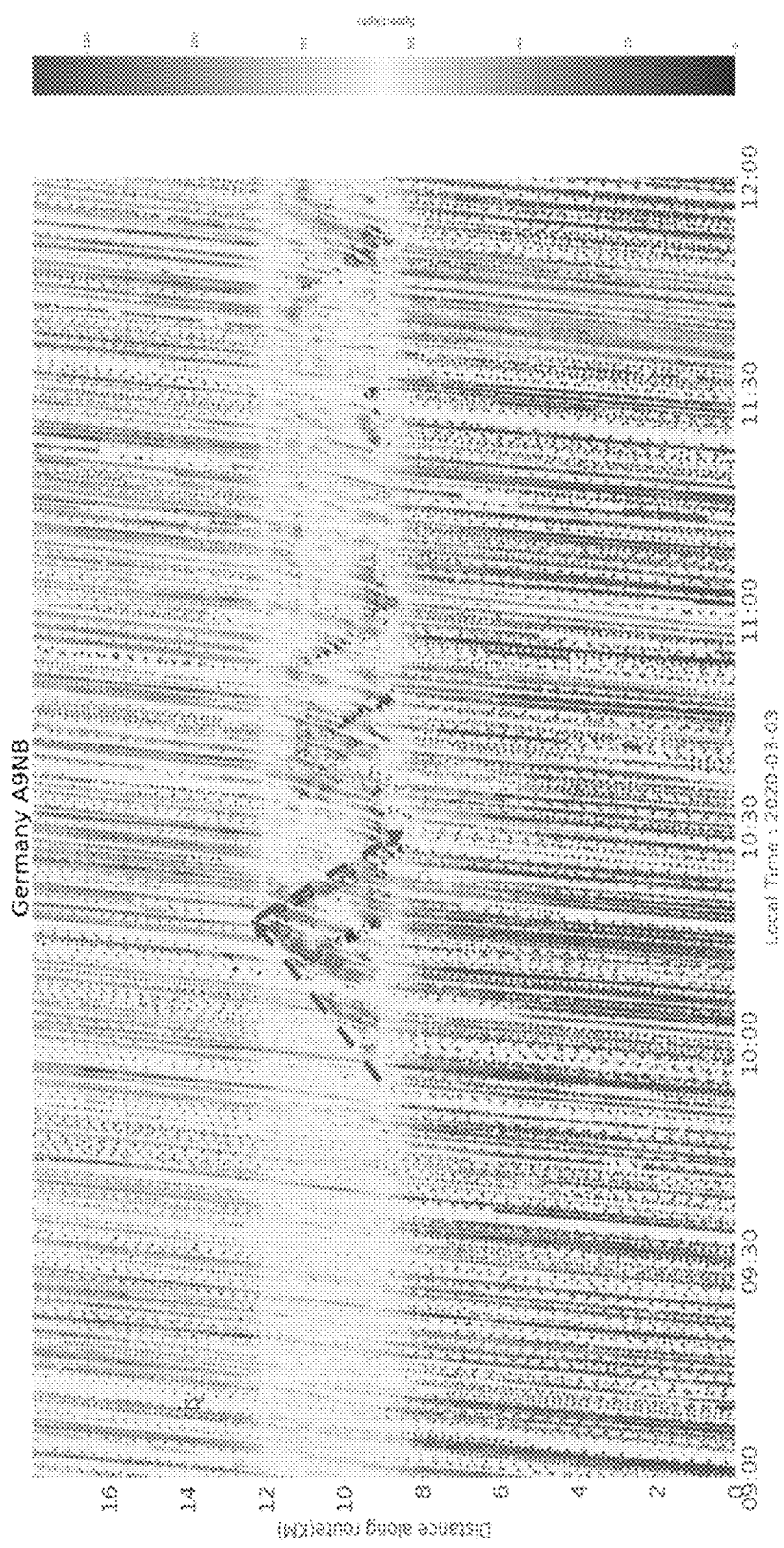
FIG. 5 is a time-space-diagram of probe vehicle data showing a moving bottleneck, according to one embodiment.

FIG. 4 is a time-space-diagram of probe vehicle data showing a moving bottleneck, according to one embodiment. The moving bottleneck due to a slow moving construction vehicle traveling in positive direction. A forward forming region is evident in this diagram. FIG. 5 is a time-space-diagram of probe vehicle data showing a moving bottleneck, according to one embodiment. The moving bottleneck on the A9 in Bavaria, Germany due to slow moving construction vehicle in positive direction at a speed approximately 7 mph. FIG. 5 shows an TSD example of a mobile road work event using vehicle probe data, when the mobile road work starts, the forward forming shockwave starts as labeled by two broken lines.

To calculate the speed of the shockwaves, the following approach was used:
1. Trace each probe's path speed as it passes a study segment,
2. Flag each of the last data points where the speed is less than 35 kph (i.e., 33% of free flow speed).
3. Separate the points into 2 groups: a. Distance Increasing group—points where each of the point's distance value is increasing as time increases, the points before 10:18 am in FIG. 6. b. Distance Decreasing group—points where each of the point's distance value is decreasing as time increases, generally the points after 10:18 am and before a stationary bottleneck is formed at Distance 9.4 km.
4. linear regression is performed on the points of each group, outliers are removed, and the slope of the regression line, or beta, is: a. the forward forming speed from the Distance Increasing Group, such as a pointing-up broken line in FIG. 5 or a pointing-up solid line in FIG. 6. b. the backward recovery or wide-moving-jam speed from the Distance Decrease Group, such as a pointing-down broken line in FIG. 5 or a pointing-down solid line in FIG. 6.

Figure 6:
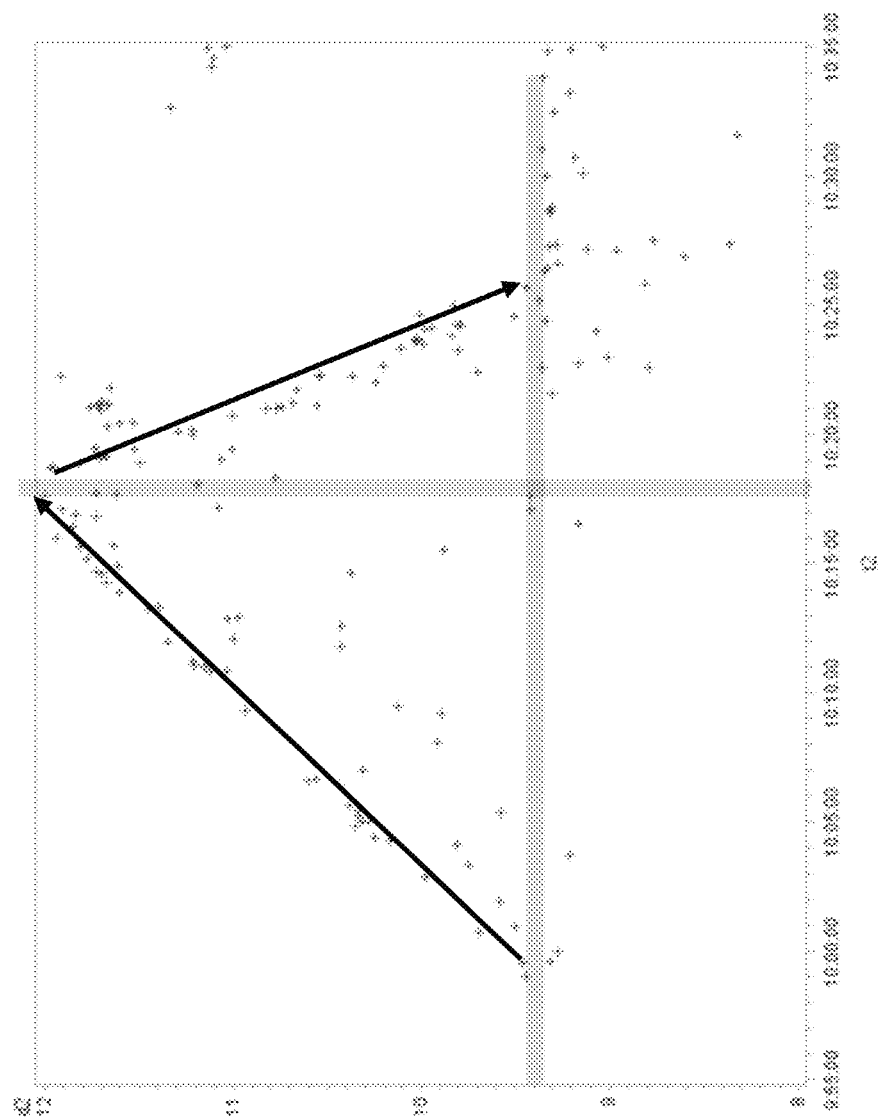
FIG. 6 is a diagram of data points for calculating shockwave speeds, according to one embodiment.

FIG. 6 is a diagram of data points for calculating shockwave speeds, according to one embodiment. The data points in the pointing-up solid line define a forward forming data set and data points in pointing-down solid line define a backward recovery data set.

The delay is calculated based on the following procedures: 1. Confine probe data bounded by the forward forming and the backward recovery shockwaves. 2. Select probe paths that travels the entire region, and calculate the travel speed of each path. 3. Get the average speed of all the selected paths. 4. Compare this average speed with the average speed outside of this congestion region. FIG. 7 is a diagram of probe paths bounded by shockwaves, according to one embodiment.

The speed of the moving bottleneck, in this example, is calculated to be approximately 8.6 km/h. referring back to FIG. 4, shortly before 10:00 AM, a slow moving vehicle passes the roadwork section and forces the traffic flow behind it to reduce the speed of 8.6 km/h.

Figure 8:
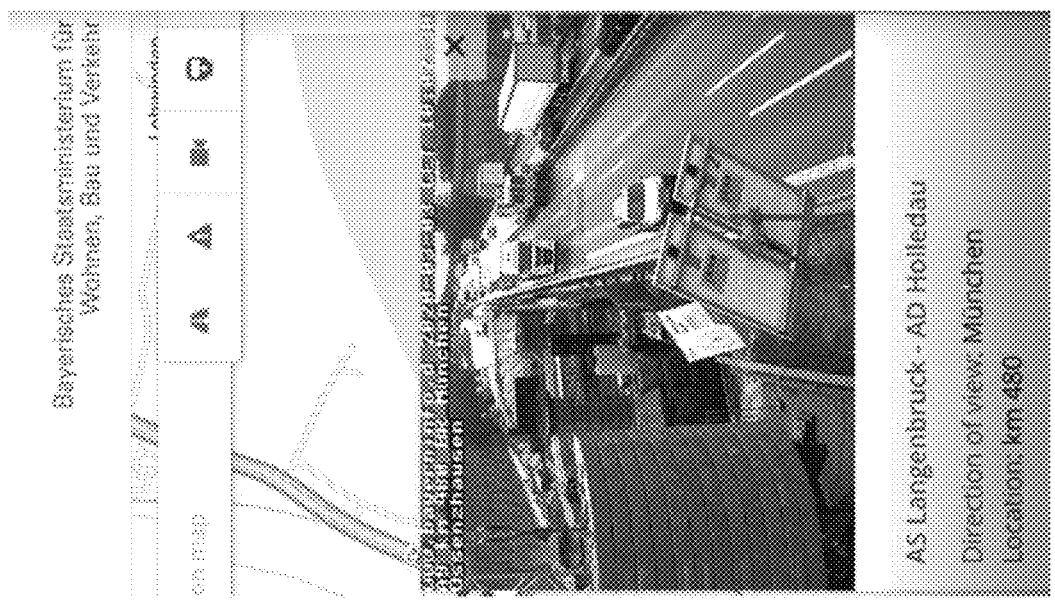
FIG. 8 is a diagram of an example user interface depicting a mobile work zone, according to one embodiment.

In this example, the reason of this slow moving bottleneck is witnessed in the video observation from Ministry in Bavaria, a screen capture of which is shown in FIG. 8 showing a construction vehicle on the left lane moving slowly. This barrier transfer machine switched the three-lane road dynamically into a two-lane road behind it on each morning. During the initial period of this study, the transfer was done each day after the morning traffic peak in the direction towards Munich. Practically, this induced traffic congestion since the two-lane freeway becomes a bottleneck.

FIG. 8 is a diagram of an example user interface depicting a mobile work zone, according to one embodiment. A construction vehicle (i.e., barrier transfer machine) was a moving bottleneck reducing the normally three lane road to two lanes at 10:07 am on Mar. 3, 2020.

Figure 9:
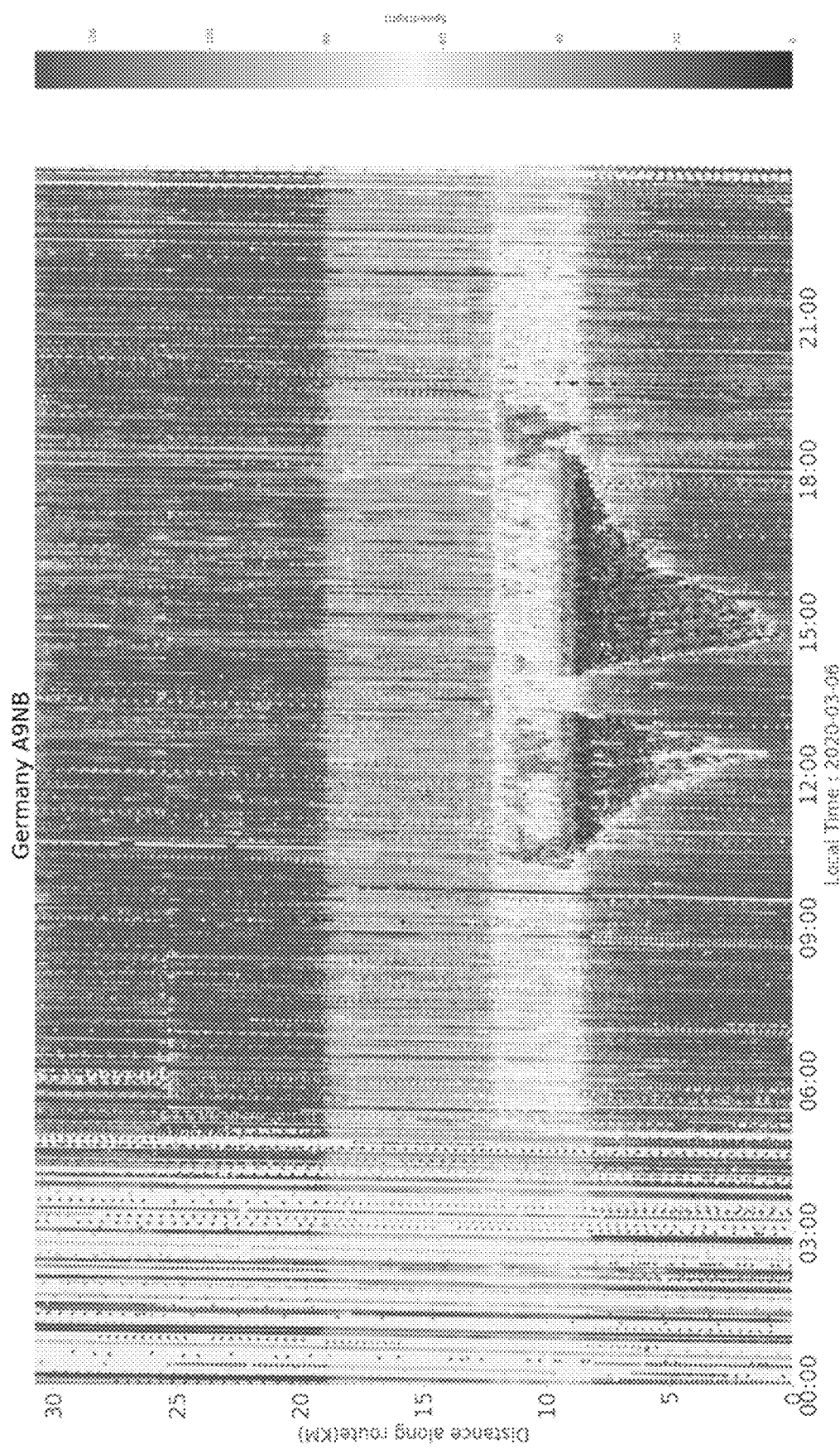
FIG. 9 is a time-space-diagram of probe vehicle data showing a moving bottleneck, according to one embodiment.

As a second example, the probe data at the same location was investigated later that week from Mar. 6, 2020. FIG. 9 is a time-space-diagram of probe vehicle data showing a moving bottleneck, according to one embodiment. FIG. 9 depicts probe data from Mar. 6, 2020 on freeway A9 northbound for ~30 km and 24 hours, with roadworks causing narrow lanes on the road section around 9-12 km.

FIG. 9 illustrates at about 10:00 am, that a moving bottleneck with the forward forming shockwaves induced a traffic congestion. The most visible difference is the emergence of two large congested patterns at the fixed bottleneck located at the lane reduction when the barrier transfer machine has reduced the number of lanes from three to two after 10:20 am.

Figure 10:
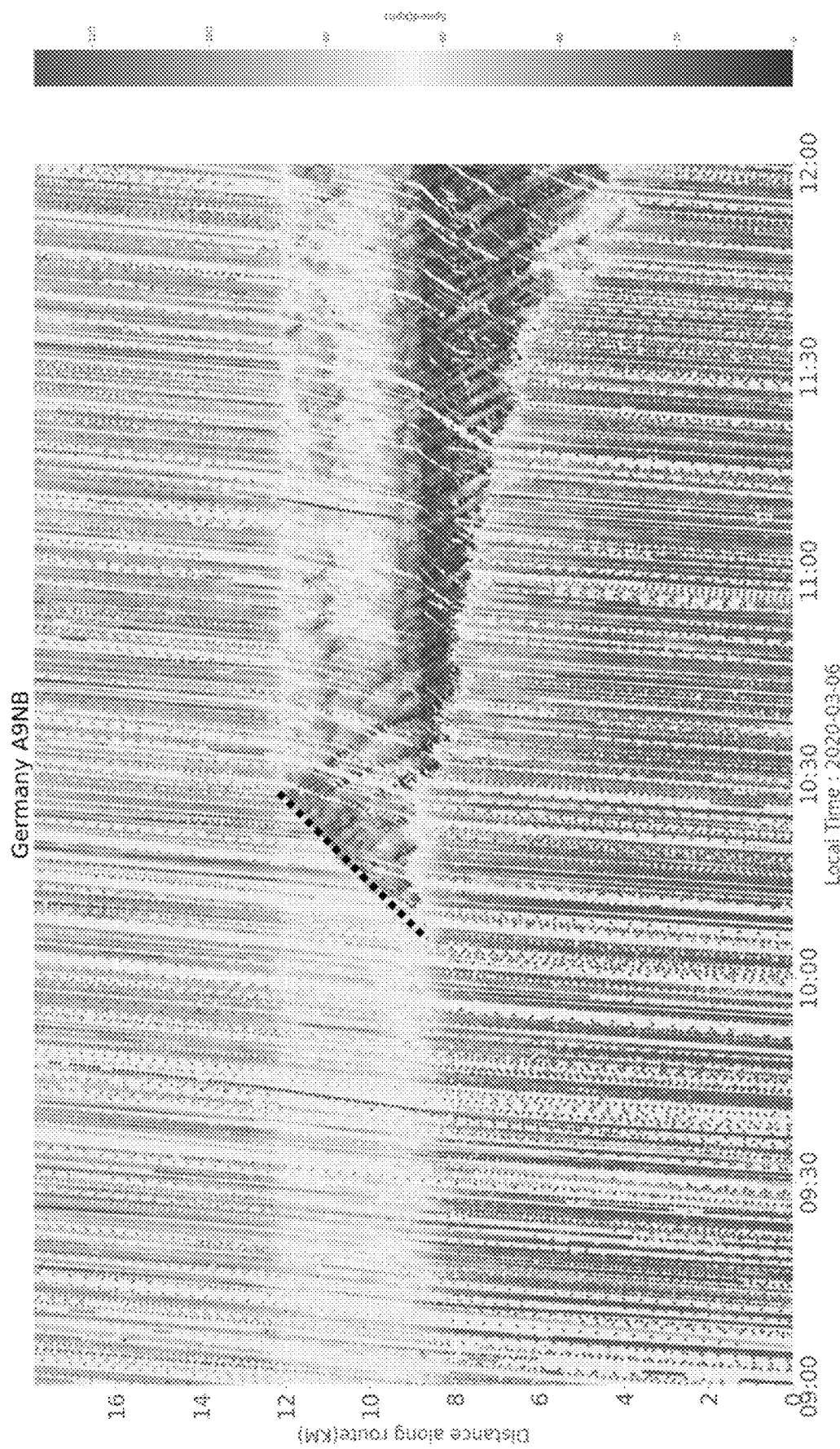
FIG. 10 is a time-space-diagram of probe vehicle data showing a moving bottleneck, according to one embodiment.

The velocity of the barrier machine is very similar on any day: the moving bottleneck moves with about 11 kph in positive direction as in FIG. 10. FIG. 10 is a time-space-diagram of probe vehicle data showing a moving bottleneck, according to one embodiment. FIG. 10 shows a moving bottleneck on the A9 in Bavaria, Germany due to a slow moving construction vehicle in positive direction causing the forward forming shock wave moving downstream at speed approximately around 8 kph.

Figure 11:
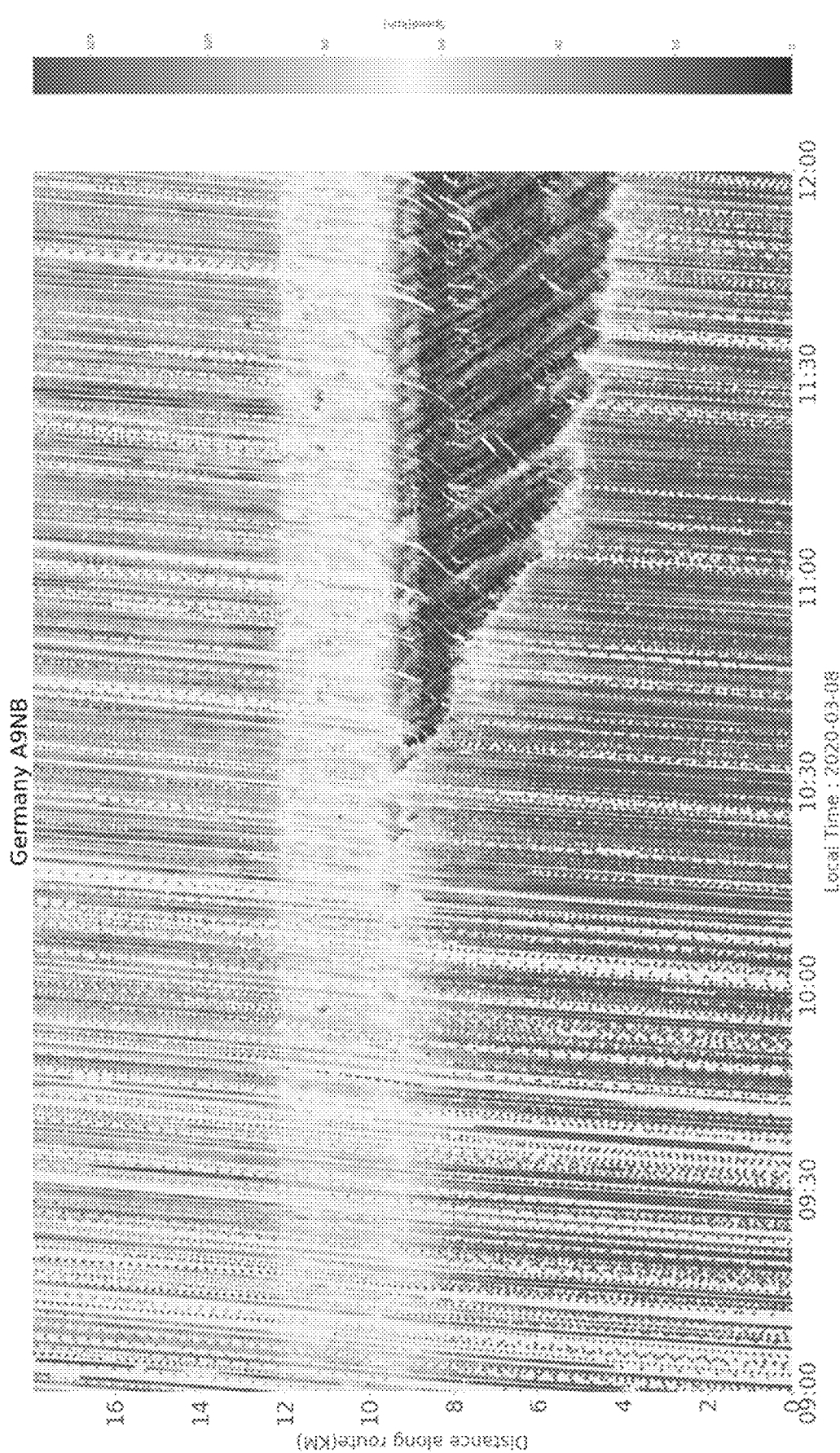
FIG. 11 is a time-space-diagram of probe vehicle data showing a fixed bottleneck, according to one embodiment.

FIG. 11 is a time-space diagram of probe vehicle data showing a fixed bottleneck, according to one embodiment. FIG. 11 shows a backward moving jam emerged at 10:30 am Mar. 8, 2020 on road A9 northbound.

In one embodiment, the traffic platform 107 has connectivity over a communication network 109 to the services platform 113 that provides one or more services 115. By way of example, the services 115 may be third party services and include mapping services, navigation services, travel planning services, notification services, social networking services, content (e.g., audio, video, images, etc.) provisioning services, application services, storage services, contextual information determination services, location-based services, information based services (e.g., weather, news, etc.), etc. In one embodiment, the services 115 uses the output of the traffic platform 107 (e.g., location corrected images, features, etc.) to localize the vehicle 103 or UE 105 (e.g., a portable navigation device, smartphone, portable computer, tablet, etc.) and/or provide services 115 such as navigation, mapping, other location-based services, etc.

In one embodiment, the traffic platform 107 may be a platform with multiple interconnected components. The traffic platform 107 may include multiple servers, intelligent networking devices, computing devices, components, and corresponding software for providing parametric representations of lane lines. In addition, it is noted that the traffic platform 107 may be a separate entity of the system 100, a part of the one or more services 115, a part of the services platform 113, or included within the UE 105 and/or vehicle 103.

In one embodiment, content providers 125a-125m (collectively referred to as content providers 125) may provide content or data (e.g., including geographic data, parametric representations of mapped features, etc.) to the geographic database 123, the traffic platform 107, the services platform 113, the services 115, the UE 105, the vehicle 103, and/or an application 111 executing on the UE 105. The content provided may be any type of content, such as map content, textual content, audio content, video content, image content, etc. In one embodiment, the content providers 125 may provide content that may aid in identifying and characterizing mobile work zones. In one embodiment, the content providers 125 may also store content associated with the geographic database 123, traffic platform 107, machine learning system 117, computer vision system 119, services platform 113, services 115, UE 105, and/or vehicle 103. In another embodiment, the content providers 125 may manage access to a central repository of data, and offer a consistent, standard interface to data, such as a repository of the geographic database 123.

In one embodiment, the UE 105 and/or vehicle 103 may execute a software application 111 to capture probe data or other observation data for identifying and characterizing mobile work zones according to the embodiments described herein. By way of example, the application 111 may also be any type of application that is executable on the UE 105 and/or vehicle 103, such as autonomous driving applications, mapping applications, location-based service applications, navigation applications, content provisioning services, camera/imaging application, media player applications, social networking applications, calendar applications, and the like. In one embodiment, the application 111 may act as a client for the traffic platform 107 and perform one or more functions associated with estimating the quality of sensor system pose data alone or in combination with the machine learning system 117.

By way of example, the UE 105 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 105 can support any type of interface to the user (such as "wearable" circuitry, etc.). In one embodiment, the UE 105 may be associated with the vehicle 103 or be a component part of the vehicle 103.

In one embodiment, the UE 105 and/or vehicle 103 are configured with various sensors for generating or collecting environmental image data (e.g., for processing by the traffic platform 107), related geographic data, etc. In one embodiment, the sensed data represent sensor data associated with a geographic location or coordinates at which the sensor data was collected. By way of example, the sensors may include a global positioning sensor for gathering location data (e.g., global positioning system (GPS), LiDAR, etc.), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UE 105 and/or vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 105 and/or vehicle 103 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 105 and/or vehicle 103 may include GPS or other satellite-based receivers to obtain geographic coordinates from satellites 121 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the traffic platform 107, machine learning system 117, computer vision system 119, services platform 113, services 115, UE 105, vehicle 103, and/or content providers 125 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 12:
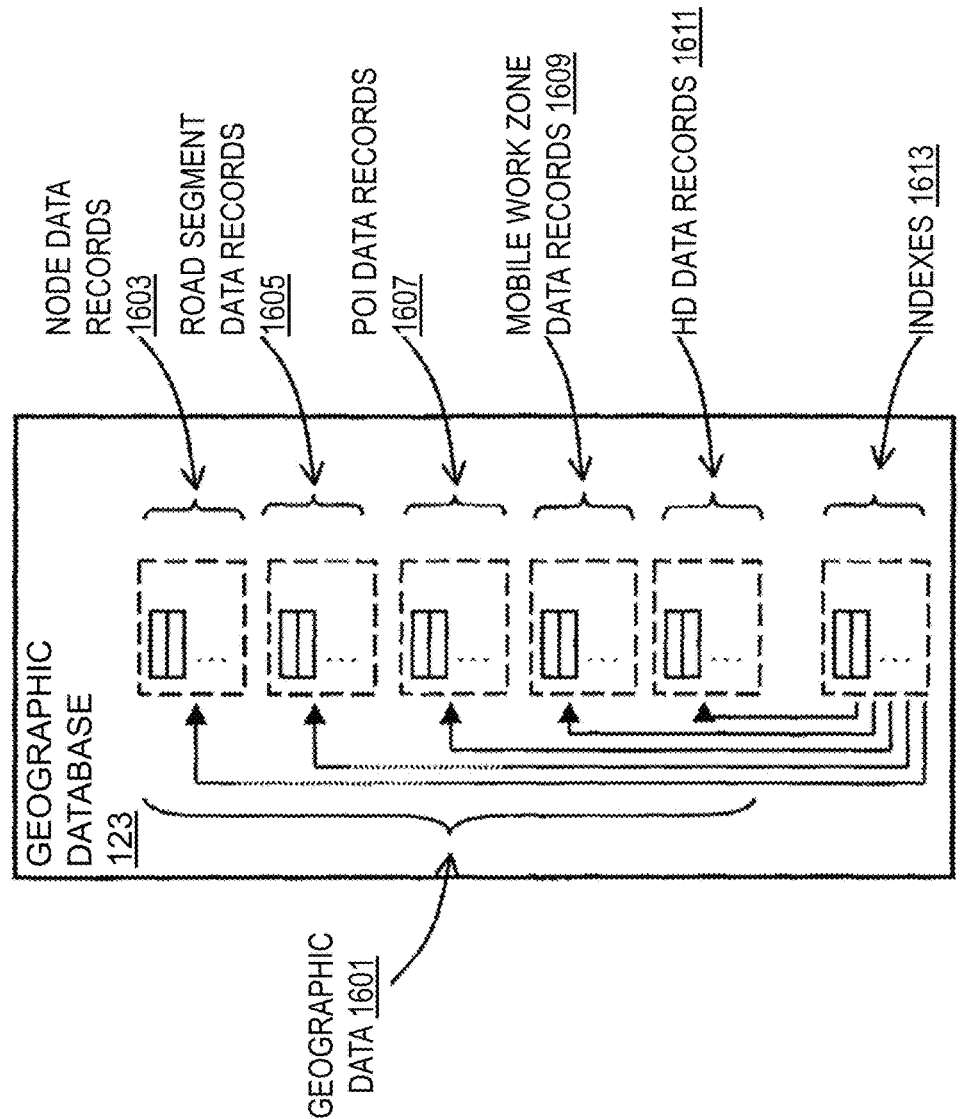
FIG. 12 is a diagram of a geographic database, according to one embodiment.

FIG. 12 is a diagram of a geographic database (such as the database 123), according to one embodiment. In one embodiment, the geographic database 123 includes geographic data 1201 used for (or configured to be compiled to be used for) mapping and/or navigation-related services, such as for video odometry based on the parametric representation of lanes include, e.g., encoding and/or decoding parametric representations into lane lines. In one embodiment, the geographic database 123 include high resolution or high definition (HD) mapping data that provide centimeter-level or better accuracy of map features. For example, the geographic database 123 can be based on Light Detection and Ranging (LiDAR) or equivalent technology to collect billions of 3D points and model road surfaces and other map features down to the number lanes and their widths. In one embodiment, the HD mapping data (e.g., HD data records 1211) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional, or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 123.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 123 follows certain conventions. For example, links do not cross themselves and do not cross each other except at a node. Also, there are no duplicated shape points, nodes, or links. Two links that connect each other have a common node. In the geographic database 123, overlapping geographic features are represented by overlapping polygons. When polygons overlap, the boundary of one polygon crosses the boundary of the other polygon. In the geographic database 123, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 123 includes node data records 1203, road segment or link data records 1205, POI data records 1207, mobile work zone data records 1209, HD mapping data records 1211, and indexes 1213, for example. More, fewer, or different data records can be provided. In one embodiment, additional data records (not shown) can include cartographic ("carto") data records, routing data, and maneuver data. In one embodiment, the indexes 1213 may improve the speed of data retrieval operations in the geographic database 123. In one embodiment, the indexes 1213 may be used to quickly locate data without having to search every row in the geographic database 123 every time it is accessed. For example, in one embodiment, the indexes 1213 can be a spatial index of the polygon points associated with stored feature polygons.

In exemplary embodiments, the road segment data records 1205 are links or segments representing roads, streets, or paths, as can be used in the calculated route or recorded route information for determination of one or more personalized routes. The node data records 1203 are end points corresponding to the respective links or segments of the road segment data records 1205. The road link data records 1205 and the node data records 1203 represent a road network, such as used by vehicles, cars, and/or other entities. Alternatively, the geographic database 123 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 123 can include data about the POIs and their respective locations in the POI data records 1207. The geographic database 123 can also include data about places, such as cities, towns, or other communities, and other geographic features, such as bodies of water, mountain ranges, etc. Such place or feature data can be part of the POI data records 1207 or can be associated with POIs or POI data records 1207 (such as a data point used for displaying or representing a position of a city).

In one embodiment, the geographic database 123 can also include mobile work zone data records 1209 for storing mobile work zone data, training data, prediction models, annotated observations, computed featured distributions, sampling probabilities, and/or any other data generated or used by the system 100 according to the various embodiments described herein. By way of example, the mobile work zone data records 1209 can be associated with one or more of the node records 1203, road segment records 1205, and/or POI data records 1207 to support localization or visual odometry based on the features stored therein and the corresponding estimated quality of the features. In this way, the records 1209 can also be associated with or used to classify the characteristics or metadata of the corresponding records 1203, 1205, and/or 1207.

In one embodiment, as discussed above, the HD mapping data records 1211 model road surfaces and other map features to centimeter-level or better accuracy. The HD mapping data records 1211 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1211 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 1211 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1211.

In one embodiment, the HD mapping data records 1211 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 123 can be maintained by the content provider 125 in association with the services platform 113 (e.g., a map developer). The map developer can collect geographic data to generate and enhance the geographic database 123. There can be different ways used by the map developer to collect data. These ways can include obtaining data from other sources, such as municipalities or respective geographic authorities. In addition, the map developer can employ field personnel to travel by vehicle (e.g., vehicles 103 and/or user terminals 105) along roads throughout the geographic region to observe features and/or record information about them, for example. Also, remote sensing, such as aerial or satellite photography, can be used.

The geographic database 123 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 103 or a user terminal 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for identifying and characterizing mobile work zones may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 13:
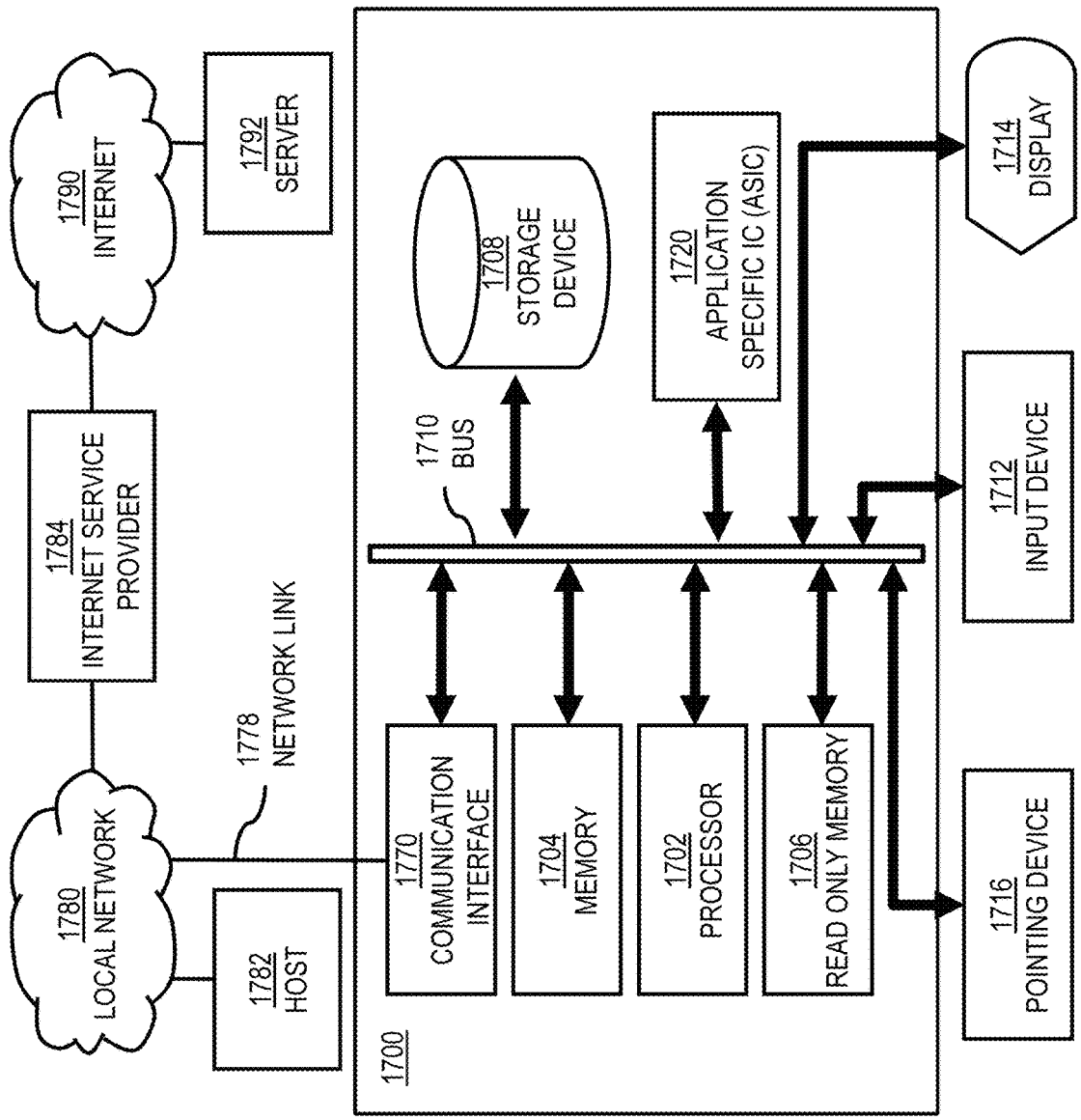
FIG. 13 is a diagram of hardware that can be used to implement an embodiment.

FIG. 13 illustrates a computer system 1300 upon which an embodiment of the invention may be implemented. Computer system 1300 is programmed (e.g., via computer program code or instructions) to identify mobile work zones as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1310 includes one or more parallel conductors of information so that information is transferred quickly among devices coupled to the bus 1310. One or more processors 1302 for processing information are coupled with the bus 1310.

A processor 1302 performs a set of operations on information as specified by computer program code related to identifying mobile work zones. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1300 also includes a memory 1304 coupled to bus 1310. The memory 1304, such as a random access memory (RAM) or other dynamic storage device, stores information including processor instructions for identifying mobile work zones. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk, or flash card, for storing information, including instructions, that persists even when the computer system 1300 is turned off or otherwise loses power.

Information, including instructions for identifying mobile work zones, is provided to the bus 1310 for use by the processor from an external input device 1312, such as a keyboard containing alphanumeric keys operated by a human user, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT) or a liquid crystal display (LCD), or plasma screen or printer for presenting text or images, and a pointing device 1316, such as a mouse or a trackball or cursor direction keys, or motion sensor, for controlling a position of a small cursor image presented on the display 1314 and issuing commands associated with graphical elements presented on the display 1314. In some embodiments, for example, in embodiments in which the computer system 1300 performs all functions automatically without human input, one or more of external input device 1312, display device 1314 and pointing device 1316 is omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of application specific ICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners, and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic, or electromagnetic signals, including infrared and optical signals, that carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 105 for identifying mobile work zones to the vehicle 103 and/or the UE 105.

The term computer-readable medium is used herein to refer to any medium that participates in providing information to processor 1302, including instructions for execution. Such a medium may take many forms, including, but not limited to, non-volatile media, volatile media, and transmission media. Non-volatile media include, for example, optical or magnetic disks, such as storage device 1308. Volatile media include, for example, dynamic memory 1304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system can be deployed in various configurations within other computer systems, e.g., host 1382 and server 1392.

Figure 14:
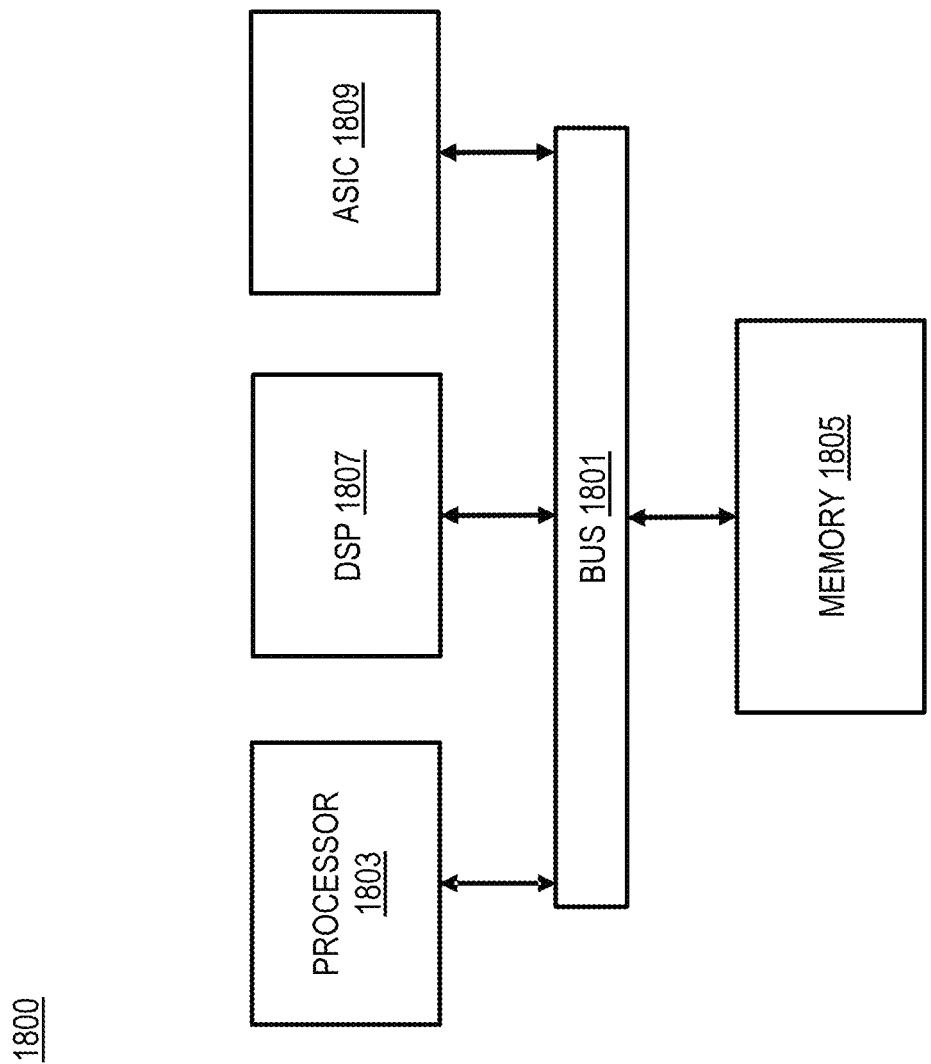
FIG. 14 is a diagram of a chip set that can be used to implement an embodiment.

FIG. 14 illustrates a chip set 1400 upon which an embodiment of the invention may be implemented. Chip set 1400 is programmed to identify mobile work zones as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to identify mobile work zones. The memory 1405 also stores the data associated with or generated by the execution of the inventive steps.

Figure 15:
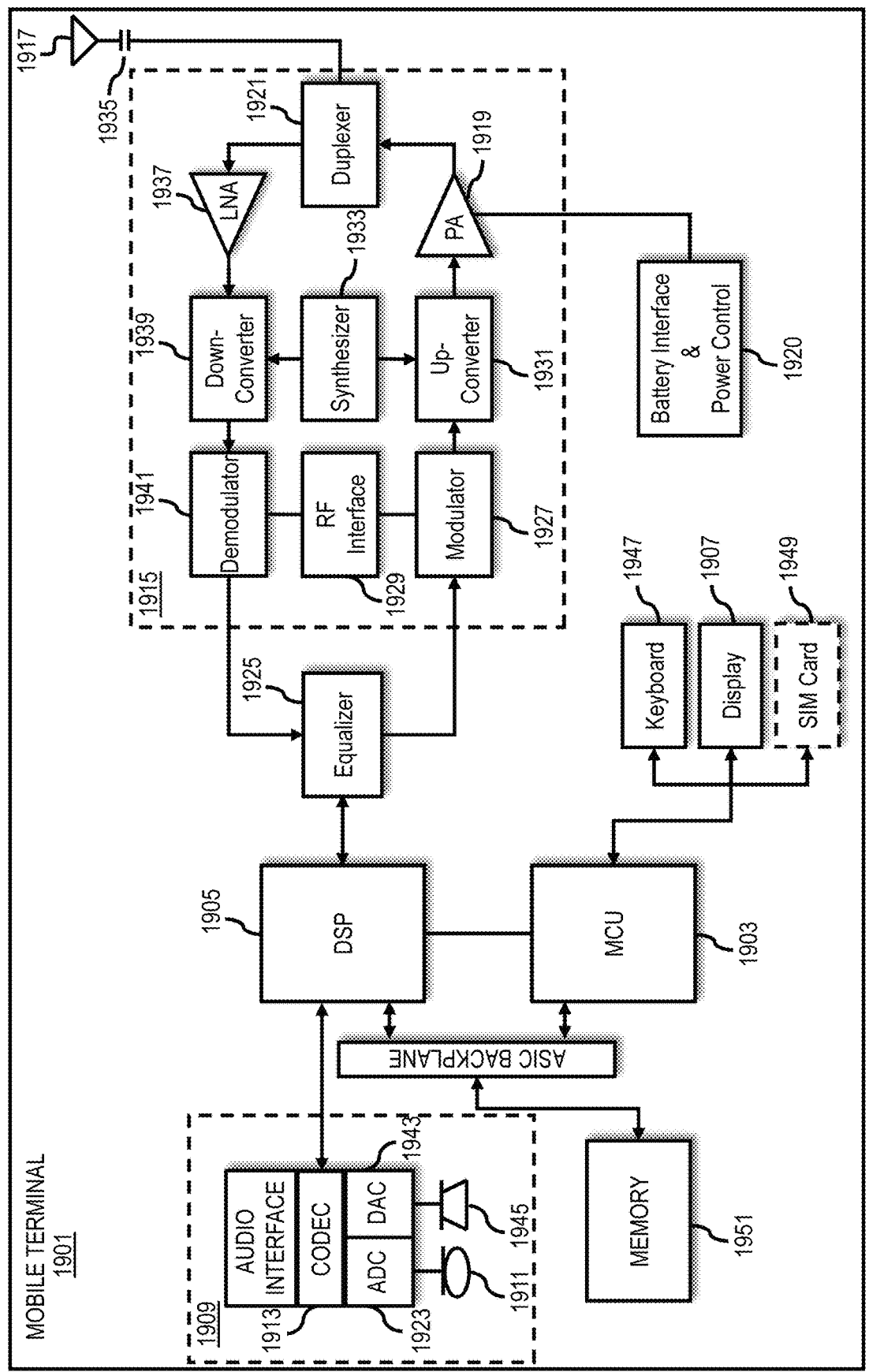
FIG. 15 is a diagram of a mobile terminal (e.g., handset, vehicle, or component thereof) that can be used to implement an embodiment.

FIG. 15 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile station functions that offer automatic contact matching. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile station 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503—which can be implemented as a Central Processing Unit (CPU) (not shown).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs a user interface software to facilitate user control of at least some functions of the mobile station 1501 to identify mobile work zones. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the station. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile station 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1551 may be, but not limited to, a single memory, CD, DVD, ROM, RAM, EEPROM, optical storage, or any other non-volatile or non-transitory storage medium capable of storing digital data.

An optionally incorporated SIM card 1549 carries, for instance, important information, such as the cellular phone number, the carrier supplying service, subscription details, and security information. The SIM card 1549 serves primarily to identify the mobile station 1501 on a radio network. The card 1549 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing probe data to determine at least one forward forming shockwave associated with a congestion front of a mobile roadwork zone, wherein the at least one forward forming shockwave is detected based on determining that the probe data indicates that at least one vehicle speed is increased by greater than a specified speed percentage within a specified travel time from the congestion front; and
providing data indicating the mobile roadwork zone as an output.

2. The method of claim 1, further comprising:
processing the probe data to determine a vehicle speed change between a congestion state and a non-congestion state,
wherein the determining of the at least one forward forming shockwave, the congestion front, the mobile roadwork zone, or a combination thereof is based on the vehicle speed change.

3. The method of claim 2, wherein the determining of the at least one forward forming shockwave, the congestion front, the mobile roadwork zone, or a combination thereof is further based on determining that the vehicle speed change occurred with a time threshold.

4. The method of claim 1, further comprising:
storing the at least one forward forming shockwave in a queue.

5. The method of claim 1, further comprising:
processing the at least one forward forming shockwave, timestamp data associated with the at least one forward forming shockwave, location information associated with the at least one forward forming shockwave, or a combination thereof to calculate a forward forming shockwave propagation rate; and
determining the mobile roadwork zone based on the forward forming shockwave propagation rate.

6. The method of claim 5, further comprising:
processing the probe data to determine one or more probe paths; and
determining a distance increase group, a distance decrease group, or a combination thereof from the one or more probe paths,
wherein the determining of the mobile roadwork zone is further based on the distance increase group, the distance decrease group, or a combination thereof.

7. The method of claim 6, further comprising:
calculating at least one forward forming shockwave speed, at least one backward recovery speed, or a combination thereof of the at least one forward forming shockwave, at least one additional forward forming shockwave, or a combination thereof based on the distance increase group, the distance decrease group, or a combination thereof,
wherein the determining of the mobile roadwork zone is further based on the at least one forward forming shockwave speed, the at least one backward recovery speed, or a combination thereof.

8. The method of claim 1, further comprising:
processing the probe data to determine a backward recovery; and
retrieving a subset of the probe data bounded by the forward forming shockwave and the backward recovery,
wherein the mobile roadwork zone is determined based on the subset of the probe data.

9. The method of claim 8, further comprising:
processing the subset of the probe data to determine travel time data, travel speed data, or a combination thereof, wherein the mobile roadwork zone is determined based on the travel time data, the travel speed data, or a combination thereof.

10. The method of claim 9, further comprising:
weighting the travel time data, the travel speed data, or a combination thereof,
wherein the mobile roadwork zone is determined based on the weighted travel time data, the weighted travel speed data, or a combination thereof.

11. The method of claim 2, further comprising:
map-matching the probe data at a lane level,
wherein the vehicle speed change between the congestion state and the non-congestion state is determined at the lane level, and
wherein the at least one forward forming shockwave, the congestion front, the mobile roadwork zone, or a combination thereof is determined based on the vehicle speed change on at least one lane.

12. The method of claim 11, further comprising:
processing the at least one forward forming shockwave, timestamp data associated with the at least one forward forming shockwave, location information associated with the at least one forward forming shockwave, or a combination thereof to calculate a forward forming shockwave propagation rate on at least one lane; and
determining the mobile roadwork zone on the at least one lane based on the forward forming shockwave propagation rate on the at least one lane.

13. An apparatus comprising:
at least one processor; and
at least one memory including computer program code for one or more programs, the at least one memory and the computer program code configured to, with the at least one processor, cause the apparatus to perform at least the following,
processing probe data at a lane level to determine at least one forward forming shockwave associated with a congestion front of a mobile roadwork zone on at least one lane, wherein the at least one forward forming shockwave is detected based on determining that the probe data indicates that at least one vehicle speed is increased by greater than a specified speed percentage within a specified travel time from the congestion front; and
providing data indicating the mobile roadwork zone as an output.

14. The method of claim 13, wherein the apparatus is further caused to:
processing the probe data to determine a vehicle speed change between a congestion state and a non-congestion state,
wherein the determining of the at least one forward forming shockwave, the congestion front, the mobile roadwork zone, or a combination thereof is based on the vehicle speed change.

15. The apparatus of claim 14, wherein the determining of the at least one forward forming shockwave, the congestion front, the mobile roadwork zone, or a combination thereof is further based on determining that the vehicle speed change occurred with a time threshold.

16. The apparatus of claim 13, wherein the apparatus is further caused to:
storing the at least one forward forming shockwave in a queue.

17. The apparatus of claim 13, wherein the apparatus is further caused to:

processing the at least one forward forming shockwave, timestamp data associated with the at least one forward forming shockwave, location information associated with the at least one forward forming shockwave, or a combination thereof to calculate a forward forming shockwave propagation rate; and determining the mobile roadwork zone based on the forward forming shockwave propagation rate.

18. A non-transitory computer-readable storage medium carrying one or more sequences of one or more instructions which, when executed by one or more processors, cause an apparatus to perform:

processing probe data at a lane level to determine at least one forward forming shockwave associated with a congestion front of a mobile roadwork zone on at least one lane, wherein the at least one forward forming shockwave is detected based on determining that the probe data indicates that at least one vehicle speed is increased by greater than a specified speed percentage within a specified travel time from the congestion front; and providing data indicating the mobile roadwork zone as an output.

19. The non-transitory computer-readable storage medium of claim 18, wherein the apparatus is caused to further perform:

processing the probe data to determine a vehicle speed change between a congestion state and a non-congestion state, wherein the determining of the at least one forward forming shockwave, the congestion front, the mobile roadwork zone, or a combination thereof is based on the vehicle speed change.

20. The non-transitory computer-readable storage medium of claim 19, wherein the determining of the at least one forward forming shockwave, the congestion front, the mobile roadwork zone, or a combination thereof is further based on determining that the vehicle speed change occurred with a time threshold.

* * * * *